United States Patent

Sato

[11] 4,026,693
[45] May 31, 1977

[54] METHOD FOR PRODUCING AN IMAGE DISSECTOR

[75] Inventor: Eiichi Sato, Tama, Japan

[73] Assignee: Olympus Optical Co., Ltd., Tokyo, Japan

[22] Filed: Feb. 14, 1975

[21] Appl. No.: 550,037

[30] Foreign Application Priority Data

Feb. 16, 1974 Japan ............................ 49-18150
Mar. 2, 1974 Japan ............................ 49-23755

[52] U.S. Cl. .................................. 65/31; 65/4 R; 65/DIG. 7; 350/96 WG
[51] Int. Cl.² .................... C03C 15/00; G02B 5/14; C03C 23/20
[58] Field of Search ............... 65/31, DIG. 7, 4 B, 65/4 A, 4 R; 350/96 WG

[56] References Cited

UNITED STATES PATENTS

| 3,255,357 | 6/1966 | Kapany et al. | 65/DIG. 7 |
| 3,347,649 | 10/1967 | Singer, Jr. | 65/4 B X |
| 3,387,959 | 6/1968 | Cole | 65/4 B X |
| 3,554,721 | 1/1975 | Gardner | 65/31 X |
| 3,674,452 | 7/1972 | Strack | 65/31 X |
| 3,717,531 | 2/1973 | Smith | 65/4 B X |
| 3,830,667 | 8/1974 | Carpenter | 65/4 B |

Primary Examiner—S. Leon Bashore
Assistant Examiner—Frank W. Miga
Attorney, Agent, or Firm—Cushman, Darby & Cushman

[57] ABSTRACT

A method for producing an image dissector having one end portion fixed in a matrix type and the other end portion fixed in a straight line. A conduit is formed by arranging plurality of single rods having an acid-soluble glass layer on one of side surfaces of every single rod so that said acid-soluble glass layers will be arrayed in parallel planes and by subjecting said single rods to thermal forming. Said conduit is soaked in acid, after shielding its one end portion, in order to dissolve said acid-soluble glass layers and to separate the other portion into ribbon-shaped layers. An image dissector is produced by arraying end portions of separated ribbon-shaped layers in a straight line and fixing them together.

9 Claims, 16 Drawing Figures

METHOD FOR PRODUCING AN IMAGE DISSECTOR

BACKGROUND OF THE INVENTION

1. Field of the Invention

The present invention relates to a method for producing an image dissector.

2. Description of the Prior Art

As known already, an image dissector is a kind of image converter having a structure as shown by numeral 1 in FIG. 1 in which a large number of optical fibers are arranged in order and bundled together, ends 2 of said optical fibers on one side being arranged in a line and their ends 3 on the other side being formed in a square matrix, said image dissector being used for performing two-dimensional scanning by means of a two-dimensional light-receiving element array by reading by one-dimensional scanning. To produce an image dissector as described in the above, it is necessary to bundle and fix respective optical fibers so that respective portions, for example, 2a, 2b and so forth of one end 2 arranged in a line will correspond to respective rows 3a, 3b, — on the other end 3, which is formed in a square, matrix, for example, from the top row to the bottom row in order. Therefore, the work for producing this kind of image dissectors has been extremely complicated.

SUMMARY OF THE INVENTION

It is, therefore, a primary object of the present invention to provide a method for producing an image dissector by fusing a layer of coloured acid-soluble glass to an arbitrary side surface of every optical fiber constituting said image dissector and by utilizing said layer of coloured acid-soluble glass.

DETAILED DESCRIPTION OF THE PREFERRED EMBODIMENT

In the following, the various steps of the method for producing an image dissector according to the present invention are described referring to the accompanying drawings.

Figure 1:
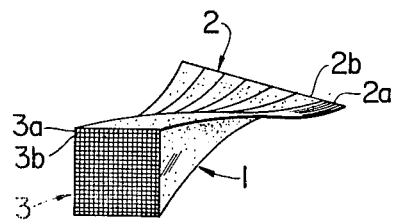
FIG. 1 shows a perspective view illustrating an example of structure of image dissectors.
Figure 3:
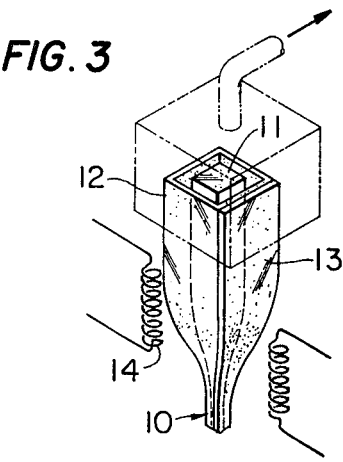
FIG. 2 through FIG. 9 respectively show respective processes of the method for producing an image dissector according to the present invention.
Figure 2A:
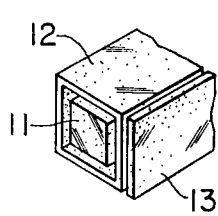
Figure 2B:
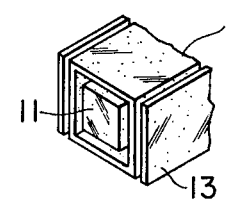
Figure 4A:
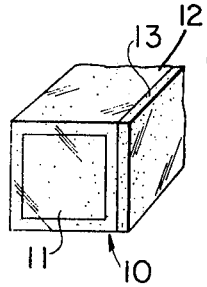
Figure 4B:
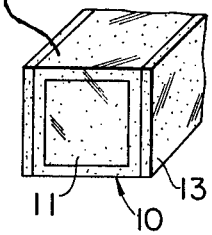
Figure 5:
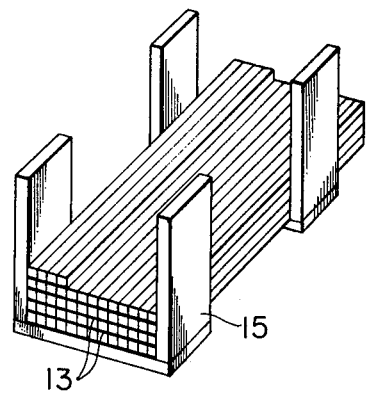
Figure 6:
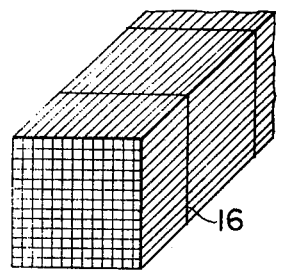
Figure 7:
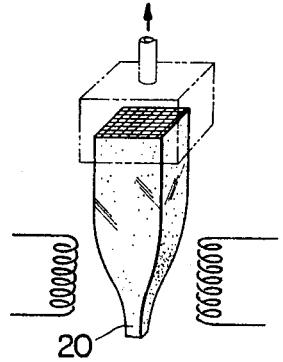
Figure 8:
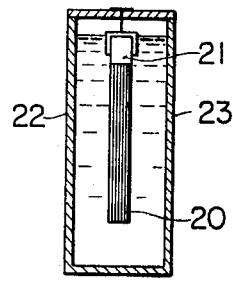
Figure 9:
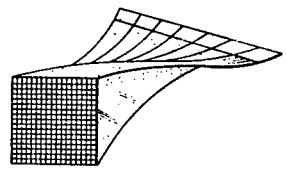

At first, as shown in FIG. 2A, outer surfaces of a core rod 11 having a cross sectional area of a regular square are covered by a coating pipe 12. Then, a plate 13 of coloured acid-soluble glass is arranged adjacent to an arbitrary side surface of one of the four side surfaces of said coating pipe 12. In another embodiment two plates 13 of coloured acid-soluble glass are arranged adjacent to two side surfaces of said coating pipe 12 which are opposite to each other as shown in FIG. 2B. After the above, thermal forming is carried out as shown in FIG. 3 by drawing the above by extracting the air existing between the core rod 11 and coating pipe 12 by a vacuum pump from one end in the direction shown by an arrowhead and by heating by a heater 14. After thermal forming is carried out as above, a square single rod in which the core rod 11, coating pipe 12 and acid-soluble glass plate 13 are fixed together is formed as designated by numeral 10 in FIG. 4A or FIG. 4B. Square rods 10 formed as above are placed side by side in order in a frame 15 as shown in FIG. 5. Said frame 15 is formed so that it can accommodate a pre-determined number of square rods 10, i.e., the number of optical fibers at one end 3, which forms a square matrix of the image dissector 1 shown in FIG. 1, for example, each having 36 square rods in both horizontal and vertical directions. When placing said square rods 10 in said frame 15, respective square rods 10 are arranged so that their side surfaces where coloured acid-soluble glass layers 13 exist will be arranged in parallel planes as shown in FIG. 5. That is, in an example shown by the dark horizontal lines 13 in FIG. 5, coloured surfaces are arranged in horizontal direction to form coloured layers between respective layers of optical fibers. A set of the required number of square rods (a multiple square rod) arranged properly as described in the above is tied by thread 16 at several places as shown in FIG. 6 and, in addition, a synthetic resin such as polyvinyl alcohol, which can be easily melted by heat, is applied to side surfaces of the multiple square rod so that its side surfaces will become airtight and the multiple square rod can be put to one body. The multiple square rod arrayed as above is subjected to thermal forming, as shown in FIG. 7, by extracting the air by a vacuum pump from one end (for example, toward the direction shown with the arrowhead) and by heating by a heater. Thus, a conduit 20 is formed in which a large number of square rods are fused together into one body. Said conduit 20 is cut to the desired length, for example, to about 30 cm. After one end portion of said cut conduit 20 is shielded by a suitable means as designated by numeral 21, said cut conduit 20 is soaked, as shown in FIG. 8, in an acid solution 23 (for example, a liquid heated to about 65° C and containing 4% of HCl and 2% of $HNO_3$) filled in a reservoir 22 for about 2 to 3 hours. After the conduit 20 is treated by acid solution 23 as above, its layers of coloured acid-soluble glass described before are dissolved by acid and are removed. Therefore, each layer of optical fibers, which are arranged side by side in horizontal direction as shown in FIG. 5, remain as fused together into one body. As, however, the layers of acid-soluble glass that existed between respective layers of optical fibers are removed, respective layers of optical fibers are thus separated from each other. In other words, ribbon-like layers respectively consisting of a plural number of optical fibers (square rods) and fused side by side in a line are in the state separated from each other. In this case, one end portion of the conduit 20 which is shielded as described in the above is not directly subjected to acid because of the shield 21 and, consequently, remains in the original state, i.e., remains as fixed together in the matrix state that the respective optical fibers are arranged. For the conduit 20, for which treatment by acid is completed, the ribbon-like portions separated from each other are arrayed in a straight line beginning, for example, with the top layer to the bottom layer in order as shown in FIG. 9, bound to each other and held by using a suitable holding member. Then, said linear end face on one end and matrix type end face on the other end are respectively ground to obtain flat surfaces. Thus, an image dissector having one end formed in a straight line and the other end formed in a matrix configuration is produced.

Figure 2C:
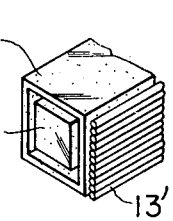
Figure 2D:
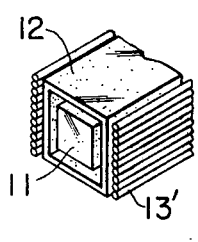
Figure 10:
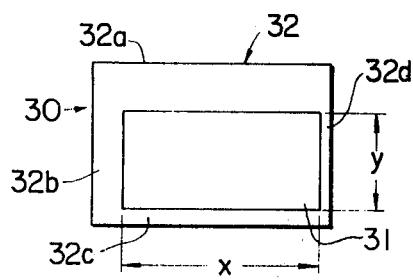
FIG. 10 shows a sectional view of a single rod of optical fiber in which a core is not at the center.

In the above explanation, each core rod had a square-shaped cross section. However, it is also possible to use core rods having rectangular cross sections, core rods for which the core is not at the center of each core as shown in FIG. 10, and so forth. Besides, in the above explanation, a plate-shaped coloured acid-soluble glass is used. It is, however, also possible to form a single rod as shown in FIG. 4A or FIG. 4B in the same way also by employing rods 13' of coloured acid-soluble glass having a small diameter. In that case, a large number of said rods 13' are arranged in a plane or planes adjacent to an arbitrary side surface of said core rod or adjacent to two side surfaces of said core rod which are opposite to each other as shown in FIG. 2C or FIG. 2D. Then, the above is subjected to thermal forming in the method as illustrated in FIG. 3 to form a single rod 10. As the process subsequent to the thermal forming is completely same as the process previously described, a detailed description thereof is not necessary.

Furthermore, when producing an image dissector using single rods in which the core rod 31 is not at the center of the coating 32 as shown in said FIG. 10, such a single rod is very difficult to produce it by the method as illustrated by FIG. 2A and FIG. 3, i.e., by heating and drawing single rods prepared by inserting a core rod into a coating pipe. This is because it is difficult to produce a coating pipe for which thicknesses of four sides, for example portions 32a, 32b, 32c and 32d shown in FIG. 10, are different from each other.

A method for easily producing such single rod is as follows: This method is described using as an example a single rod for which lengths of respective sides of the rectangular cross section of the core shown in FIG. 10 are x and y and thicknesses of portions of the coating 32 designated by numerals 32a, 32b, 32c and 32d are respectively $t_1$, $t_2$, $t_3$ and $t_4$.

Figure 11:
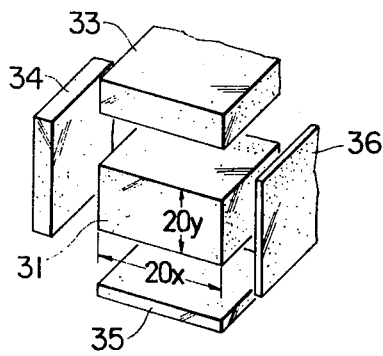
FIG. 11 through FIG. 12 respectively show processes for producing said single rod shown in FIG. 10.
Figure 12:
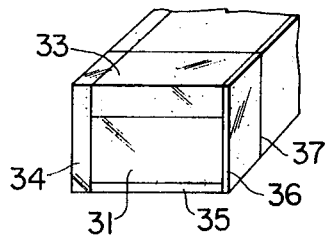

That is, around the core rod 31, glass plates 33, 34, 35 and 36 which will serve as coatings are arranged instead of the coating pipe, which was used before, as shown in FIG. 11. Said core rod 31 and glass plates 33, 34, 35 and 36 are respectively formed to have dimensions corresponding to, for example, 20 times of dimensions of the final product having the cross section shown in FIG. 10. That is, lengths of respective sides of the cross section of the rectangular core rod 31 are 20x and 20y. Out of glass plates which will serve as coating, glass plates 33 and 35 respectively have width of 20x and thicknesses of $20t_1$ and $20t_3$, and glass plates 34 and 35 respectively have width of $20(y + t_1 + t_3)$ and thicknesses $20t_2$ and $20t_4$. The rectangular core rod 31 and respective glass plates 33 through 36, which will serve as coating, described in the above are combined as shown in FIG. 12 after grinding their surfaces and tied by thread 37 at several places. Besides, joint portions of glass plates 33 through 36 which will serve as coating are sealed by an inflammable sealing material such as polyvinyl alcohol. The core rod and glass plates combined as above are subjected to thermal forming by extracting the air by a vacuum pump all as previously described. Thus, it is possible to obtain a single rod, in which the core rod is not at the center, as shown in FIG. 10, of the required dimensions.

When the above-mentioned method is adopted, it is also possible to easily produce, besides the single rod having the cross section as shown in FIG. 10, a single rod for which $t_1$ and $t_3$ are equal, i.e., the core is shifted only in horizontal direction in FIG. 10, and a single rod for which $t_2$ and $t_4$ are equal, i.e., the core is shifted only in vertical direction in FIG. 10.

Furthermore, when a core rod having a regular-square cross section is used as the core rod 31 and glass plates respectively having the same thickness are used as glass plates 33, 34, 35 and 36 which will serve as coating, it is possible to produce a single rod shown in FIG. 4A or FIG. 4B. Also in this case, production becomes somewhat complicated when the method shown in FIG. 2A through 2D and FIG. 3 is adopted because it is then necessary to insert the core rod into the coating pipe. When, however, the method shown in FIG. 11 and FIG. 12 is adopted, it is extremely easy to produce the single rod.

Also in case that the image dissector is produced by adopting the above-mentioned method to produce a single rod by arranging glass plates, which will serve as coating, around the core rod, it is of course necessary to arrange a thin plate or plates or large number of rods of small diameter made of acid-soluble glass adjacent to any one glass plate or mutually opposed two glass plates out of glass plates 33 through 36 shown in FIG. 11 before heating and drawing to form a single rod.

In the above explanation, a plate or plates of coloured acid-soluble glass are employed as shown in FIG. 2A or FIG. 2B or a large number of coloured acid-soluble glass rods of small diameter are employed as shown in FIG. 2C or FIG. 2D. But, it is not always necessary to colour the acid-soluble glass It is, however, more preferable to colour the acid-soluble glass because it is then more convenient to array the acid-soluble glass layers 13 fused to respective single rods in parallel planes as shown in FIG. 5.

As explained in the above, by the method for producing an image dissector according to the present invention, it is possible to arrange single rods so that coloured acid-soluble glass layers can be easily arrayed in parallel planes and, moreover, can be separated to ribbon-shaped layers by a simple process to soak in acid solution. Therefore, it is possible to produce image dissectors having complicated structure extremely easily and in a large number.

I claim:

1. A method of producing an image dissector comprising the steps of:
   a. providing a single rectangular cross-section glass rod having a core of optical fiber with a thin layer of acid-soluble glass adjacent only one side surface on only two opposite surfaces thereof, and thermally forming the thus-coated glass rod using a heating element;
   b. arranging a plurality of the formed glass rods of step (a) in a matrix configuration to form an optical conduit by placing the acid-soluble glass coated side surface of each of said individual coated rods in parallel planes with respect to each other;
   c. thermally forming the matrix configuration of rods of step (b) using a heating element thereby fusing the rectangular rods together into a unitary body;
   d. shielding one end of the fused body of step (c) with an acid resistant material, then dissolving and removing the thin layers of said soluble glass by subjecting the fused, shielded body to an acid solution, and separating the acid-treated portion of the conduit into a plurality of ribbon-shaped layers having the adjacent uncoated glass rod surfaces fused to each other; and e. selectively arranging the ends of the layers of step (d) in a straight line which corresponds to the arrangement in the matrix end of the body and binding the thus arranged layers to each other forming an image dissector having one end in a straight line configuration and the other end thereof in a matrix configuration.

2. A method according to claim 1 wherein the layers of acid-soluble glass are colored.

3. A method according to claim 1 wherein the rods have a square cross-section.

4. A method according to claim 3 wherein the layers of acid-soluble glass are colored.

5. A method according to claim 1 wherein the layer of acid-soluble glass is formed in step (a) by providing a plurality of acid-soluble glass fibers in a plane adjacent said surface of the glass rod.

6. A method according to claim 5 wherein the glass fibers are colored.

7. A method according to claim 1 further including providing a coating sheath around said glass rod, the thin layer of acid-soluble glass being applied to one side surface of said coating sheath.

8. A method according to claim 7 wherein the layers acid-soluble glass are colored.

9. A method of claim 1 wherein a thin layer of acid-soluble glass is provided in step (a) on only two opposite surfaces of said rectangular cross-section glass rod and in step (b) the rods are arranged in a matrix configuration by placing the acid-soluble glass coated side surfaces of each of the individual coated rods in parallel planes with respect to each other.

* * * * *